(No Model.)
F. W. BRIDENBECKER.
HEN'S NEST.
No. 429,008. Patented May 27, 1890.
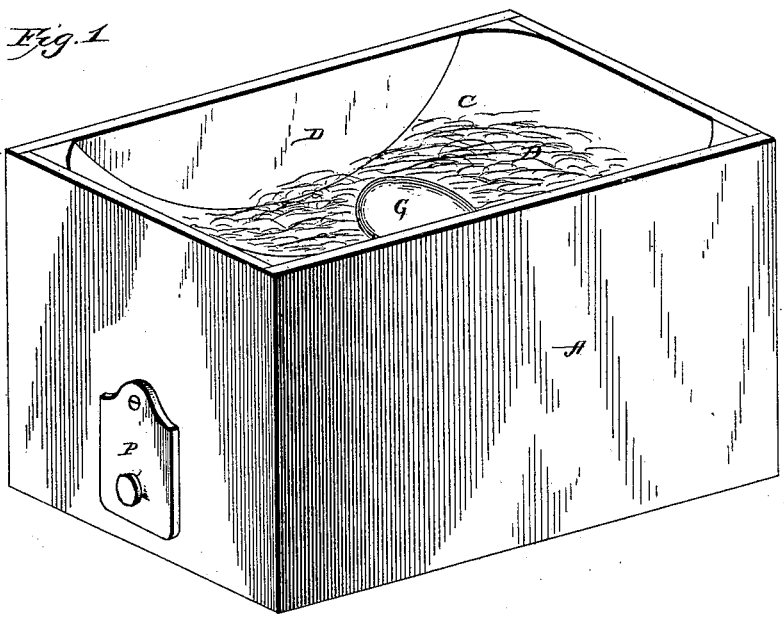
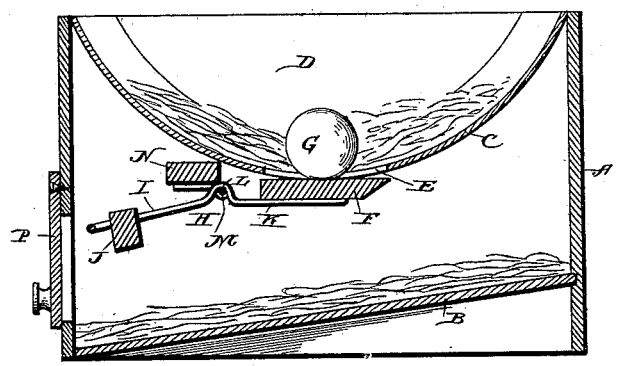
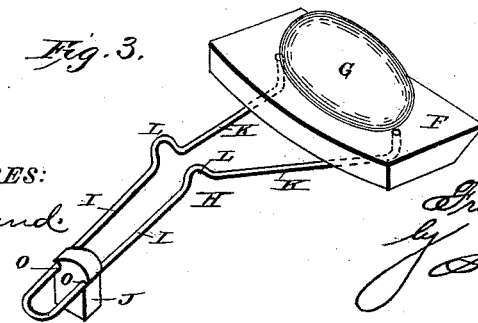
WITNESSES: INVENTOR:
Frank W. Bridenbecker,
by Louis Bagger & Co.
Attorneys.

UNITED STATES PATENT OFFICE.

FRANK W. BRIDENBECKER, OF FRANKFORT, NEW YORK.

HEN'S NEST.

SPECIFICATION forming part of Letters Patent No. 429,008, dated May 27, 1890.

Application filed January 10, 1890. Serial No. 336,468. (No model.)

*To all whom it may concern:*

Be it known that I, FRANK W. BRIDENBECKER, a citizen of the United States, and a resident of Frankfort, in the county of Herkimer and State of New York, have invented certain new and useful Improvements in Hens' Nests, and I do hereby declare that the following is a full, clear, and exact description of the invention, which will enable others skilled in the art to which it appertains to make and use the same, reference being had to the accompanying drawings, which form a part of this specification, and in which—

Figure 1 is a perspective view of my improved nest. Fig. 2 is a longitudinal sectional view of the same on a vertical plane; and Fig. 3 is a perspective detail view of the vibratory egg bar or lever with its adjustable counterpoise.

Like letters of reference denote corresponding parts in all the figures.

This invention relates to artificial nests for hens and other domestic fowls, and has for its object to prevent the setting fowl from eating or otherwise destroying the eggs, to prevent rats and other animals from robbing the nest or destroying the eggs, and, further, to keep the eggs fresh and sweet by automatically withdrawing them from the nest immediately after they have been laid.

Reference being had to the accompanying drawings, the letter A designates a box of rectangular or any other suitable shape, having an inclined bottom B. This box has a concave top or cover C, forming the nest D, which may be lined with felt or some other soft material adapted for the purpose.

In the middle of the concave top C, forming the deepest part or bottom of the nest, is an oblong aperture E, which is closed from the under side by a disk or plate F, upon which is fastened an artificial imitation egg or dummy G, made of porcelain or other suitable material, in such a manner that when the aperture E is closed the dummy egg G will project up through said aperture and appear to be resting in a natural position in the bottom of the nest.

Plate F, upon which, as we have seen, the dummy is fastened, is attached to one end of a bar or lever H, the detailed construction of which will appear more fully by reference to Fig. 3 of the drawings. This lever is preferably made of stiff wire or a thin metal rod doubled upon itself to form parallel sides I I, upon which slides the weight or counterpoise J and diverging sides K K, upon which the disk or plate F is fastened. At the point where the sides of the arm K diverge from those of arm I the wire is bent or looped to form notches L, by means of which the lever is hung upon a hinge-bar M, affixed to the under side of the transverse brace or cross-bar N within the box.

The counterpoise J has two side notches O O, which engage the parallel sides I I of lever H with sufficient friction to retain the counterpoise in its adjusted position. At the same time, however, the counterpoise may readily be moved by the fingers forward or back, so as to balance approximately the weight of the disk and dummy at the other end of the lever in such a manner as to always close the aperture in the nest lightly and bring the dummy egg up into its proper position in the bottom of the nest.

One end of the nest-box A is closed by a door or slide P, through which access may be had to the interior of the box for the purpose of removing the eggs deposited therein, and the inclined bottom B is preferably covered with a layer of sawdust, fine-cut straw, or fine shavings, to prevent the eggs from breaking as they drop down into the box.

From the foregoing description, taken in connection with the drawings, the operation of this device will be readily understood without extended explanation. As the eggs are deposited in the nest one by one, they will add their weight to that of the dummy G by pressing against or upon it, thereby overcoming the weight of the counterpoise J and tilting the lever, thus lowering the disk F and thereby opening the aperture E, through which the freshly-laid egg drops down into the box below, after which the disk and dummy will immediately and automatically resume their normal closed position. The bottom of the box forming an inclined plane, the eggs as they are dropped into the box will roll down one by one into one end of the box toward the door P, whereby I prevent the eggs from breaking by dropping upon one another as they are deposited through the aperture in the bottom of the nest.

Having thus described my invention, I claim and desire to secure by Letters Patent of the United States—

As a new article, a hen's nest consisting of the box A, having inclined bottom B, door P, and concaved top D, forming a nest-body with a central aperture, the transverse bar M, the lever comprising the parallel arms I I and diverging arms K K and having loops or notches L, the disk F, provided with dummy G, and the sliding weight J, substantially as and for the purpose described.

In testimony that I claim the foregoing as my own I have hereunto affixed my signature in presence of two witnesses.

FRANK W. BRIDENBECKER.

Witnesses:
A. S. NOLTON,
H. H. INGHAM.